United States Patent [19]
Ford et al.

[11] Patent Number: 5,938,469
[45] Date of Patent: Aug. 17, 1999

[54] UNDERWATER CONNECTOR

[75] Inventors: Richard Ford; Randolph K. Ford, both of Collingwood, Canada

[73] Assignee: Walker Downriggers, Inc., Canada

[21] Appl. No.: 08/937,548

[22] Filed: Sep. 25, 1997

[51] Int. Cl.[6] .............................................. H01R 13/58
[52] U.S. Cl. ......................................................... 439/459
[58] Field of Search ................................... 439/456, 457, 439/459, 577

[56] References Cited

U.S. PATENT DOCUMENTS

| | | | |
|---|---|---|---|
| 2,511,037 | 6/1950 | Bedoiseau | 439/459 |
| 2,735,207 | 2/1956 | Christiansen | 43/15 |
| 3,905,711 | 9/1975 | Rogers | 403/16 |
| 3,910,524 | 10/1975 | Ireland | 242/106 |
| 3,916,555 | 11/1975 | Booth et al. | 43/27.4 |
| 3,922,808 | 12/1975 | Rieth et al. | 43/4 |
| 3,999,828 | 12/1976 | Howell | 339/75 P |
| 4,104,917 | 8/1978 | Rieth et al. | 73/343 R |
| 4,178,057 | 12/1979 | McCormick | 439/459 |
| 4,191,340 | 3/1980 | Kubanek | 242/54 R |
| 4,253,165 | 2/1981 | Christiansen | 367/96 |
| 4,809,408 | 3/1989 | Abrahamson | 24/136 K |
| 5,483,767 | 1/1996 | Langer | 43/4 |
| 5,511,335 | 4/1996 | Langer | 43/4 |
| 5,533,911 | 7/1996 | Elam | 439/459 |
| 5,626,491 | 5/1997 | Hasircoglu | 439/459 |

OTHER PUBLICATIONS

EDN, Color video travels on twisted–pair cable, Raphael Horton, Aug. 17, 1995.
R&D Magazine, Cable TV Runs on Twisted–pair Lines, Sep., 1995.
Chip Allows Broadcasts over Telephone Wire.
Electronic Design, Video–Compression Chip Is The First To Use Wavelets, Paul McGoldrick, Aug. 19, 1996.
Analog Devices, ADV601 Preliminary Data Sheet—Low Cost Multiformat Video Codec, Jan., 1996.

*Primary Examiner*—Gary F. Paumen
*Attorney, Agent, or Firm*—Olson & Hierl, Ltd.

[57] ABSTRACT

A coupling system suitable for use with a transmission cable is described. The system includes a tongue and a connector housing coupled to a cinch. The connector housing is generally cylindrical. The connector housing defines an open bore adapted to receive the cable and has an aperture at one end of the housing. The cinch is attached to the connector housing and has two walls that diverge from each other and the housing aperture. The tongue is adapted to wedge the cable between the cinch walls and outer peripheral surface of the tongue.

15 Claims, 11 Drawing Sheets

UNDERWATER CONNECTOR

FIELD OF THE INVENTION

The present invention relates to couplings, and in particular to a coupling system for a transmission cable having tension relief and protection thereof.

BACKGROUND OF THE INVENTION

A downrigger is a fishing implement used in conjunction with a regular fishing rod when deep water fishing on the Great Lakes and the oceans. The typical downrigger has a line wound on a manually or electrically operated reel. A heavy weight is placed at the end of the downrigger line which extends from the reel. Further, the downrigger line is detachably fastened to a fishing line having a fish hook with bait or a lure affixed to it.

Both the downrigger line and the fishing line are lowered into the water to a desired depth. When a fish is hooked, the fishing line is separated from the downrigger line as a consequence of the fish pulling on the fish hook to free itself. The fisherman may then play the fish without having the downrigger weight to contend with along with the fish.

As is well known, many species of fish prefer known temperatures. Areas providing such temperatures can be quite deep, especially in the Great Lakes or oceans. Correspondingly, when fishing at such depths, the fisherman cannot see fish approach and strike the lure.

When fishing, it is desirable to have the ability to view the fish. Besides adding excitement to the fishing experience, viewing the fish provides a record in case the fish escapes.

Care must be taken, however, in providing a downrigger line and a device suitable for transmitting real-time images about the lure. In particular, the line must be of a relatively small diameter to fit on a compact trolling reel suitable for the sport fisherman. Further, the tensile strength must be relatively high since significant tension forces are placed on the line when it is payed out a significant distance and especially if the line becomes snagged.

Moreover, a suitable coupling scheme must be employed between the line and the image transmitting device, such as an underwater camera. The coupling scheme must securely retain the connection between the camera and the electrical conductors provided by the line for transmitting images.

Furthermore, the coupling scheme should provide strain relief between the line and the camera to prolong the life of the line. Moreover, the coupling scheme should transfer any pulling forces to the camera without applying these forces to the electrical conductors.

It is also desirable that the connection system allow for easy attachment of the line to the camera and prevent inadvertent uptake of the line.

Correspondingly, the present invention provides a system which satisfies the above-discussed criteria while providing tension relief for a cable suitable pulling an underwater camera and having image signal transfer capability.

SUMMARY OF THE INVENTION

The present invention provides a coupling system for a cable used to both tow an electrical signal transmission device and convey the electrical signals.

The structure embodying the present invention is especially suitable for use with deep water fishing. The invention provides strain relief for the cable as well. Further, leads within the cable for carrying electrical signals are not subjected to significant pulling forces.

The coupling system embodying the present invention includes a tongue, a wire harness, and a connector housing coupled to a cinch. The connector housing is generally cylindrical and defines an open bore having an open end and adapted to receive a cable. The cinch is attached to the connector housing and has two walls that diverge from each other and the bore open end. The tongue has an outer periphery and is adapted to wedge the cable between the cinch walls and the tongue outer periphery. The wire harness is operably connected to the cable to provide for the transmission of electrical signals.

BRIEF DESCRIPTION OF THE DRAWINGS

In the accompanying drawings that form part of the specification, and in which like numerals are employed to designate like parts throughout the same.

DESCRIPTION OF THE PREFERRED EMBODIMENT

A coupling system embodying the present invention has a connector assembly with a tongue. The connector assembly includes a housing coupled to a cinch and a wire harness. The housing is generally cylindrical and defines a bore having an opening and adapted to receive the cable. The cinch is attached to the housing and has two walls that diverge from each other and the bore opening. A cable is wedged between the cinch walls and a tongue received therebetween. Further, the wire harness is operably connected to the cable for transmission of electrical signals.

Figure 1:
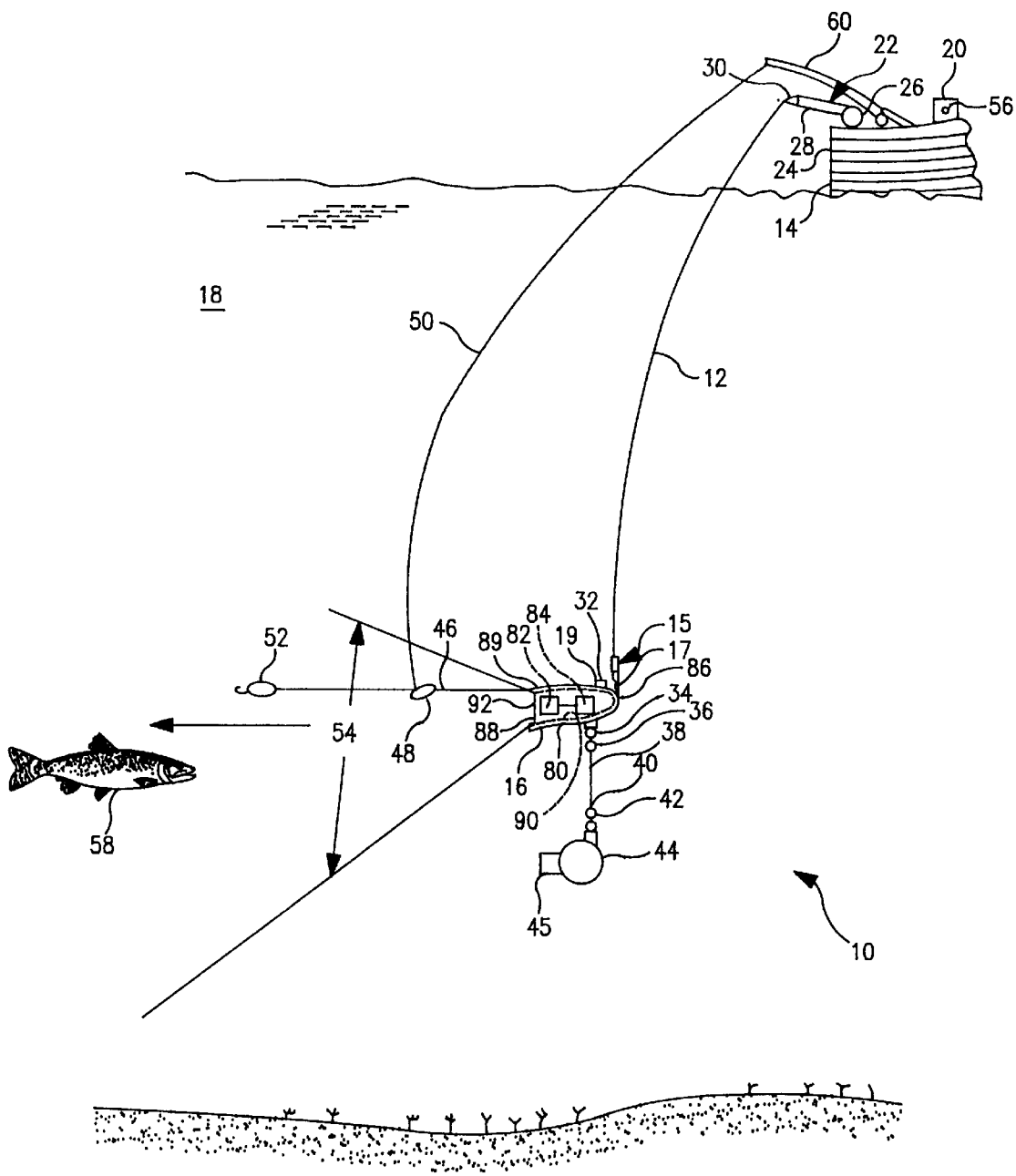
FIG. 1 is a schematic cross-sectional elevational of a body of water and illustrating the operation of an underwater viewing system with a connector assembly in accordance with the present invention coupled between a camera assembly and a cable attached to a motorized reel assembly.

Referring to the drawings, and particularly to FIG. 1, an underwater viewing system 10 is depicted having a cable 12 extending from a fishing boat 14 and terminating at a connector assembly 15 beneath the surface of the water 18. The connector assembly 15 is attached to a camera assembly 16 that provides for transmitting images of objects about lure 52.

Accordingly, the cable 12 provides for real-time transmission of image signals from the camera assembly 16 to the boat 14. Operably connected to the cable 12 is a display 20 on the boat 14 for visually presenting those images introduced within the camera assembly's field of view.

The connector assembly 15 provides a conventional snap swivel 17 for coupling the connector assembly to the camera 16. The connector assembly 15 also includes a plug connector 19 for electrically coupling the cable 12 to the camera 16.

The cable 12 is attached to a motorized reel assembly 22 mounted on the stern 24 of the boat 14. The reel assembly 22 includes a reel 26 and a flexible action arm 28 generally upwardly sloping away from the reel with a guide wheel 30 rotatably mounted to the end thereof.

The cable 12 is attached to and wrapped around reel 26. The cable 12 extends from the reel 26, over the guide wheel 30 and the edge of the boat 14, and into the water 18. The motorized reel assembly 22 provides for electrically raising and lowering the cable 12 having the underwater camera assembly 16 attached proximate to the cable's free end 32.

Coupled to the camera assembly 16, via a conventional ball bearing swivel 34, is one end 36 of a safety breakaway cable 38. The other end 40 of the safety cable 38 is fastened to a snap swivel 42 that provides for releasible attachment to a relatively heavy metal weight 44.

The weight 44 may vary from, for example, one pound to thirty pounds. The particular weight a fisherman will use depends upon the type of fishing which he is doing, the depth at which he is fishing, whether or not he is trolling or standing still, the presence of currents in the water in which he is fishing and the like.

The weight 44 is conventional in shape and also preferably provides for stability, such as preventing porpoiseing of the camera assembly 16, while traveling through the water 18. Correspondingly, the weight 44 may be shaped generally like a fish, a pancake,-a cannonball having a vertical stabilizer or fin 45, or any other suitable shape.

Preferably, the cable 12 has a greater tensile strength than the safety breakaway cable 38. Thus, if the weight 44 becomes snagged during trolling, the safety cable 38 will sever so that the cable 12 and reel assembly 22 are prevented from being damaged. The breakaway cable 38 consists of any suitable material such as nylon, steel, or the like.

Extending from the camera assembly 16 is a cord 46 with a conventional release mechanism 48 attached to the free end of the cord. Mechanism 48 releasably holds onto fishing line 50 having a fishhook or lure 52 tied to the fishing line's free end. Preferably, while line 50 is attached to the release mechanism 48, the lure 52 is continuously in the viewing range 54 of the camera assembly 16 such that, as explained in detail further herein, a substantially representative image 56 of the lure is provided on display 20.

When a fish 58 strikes the lure 52, the efforts of the fish to free itself results in fishing line 50 being released by mechanism 48. Thus, the fisherman is permitted to play the fish in the usual fashion by means of a fishing rod 60 to which the fishing line 50 is secured.

FIG. 1 illustrates an advantage of using the underwater viewing system 10 because, as will be discussed in further detail, the fisherman can actively view an image 56 of the fish on the display 20 as the fish approaches and strikes the lure 52. Thus, the fisherman is alerted before the fish strikes the lure and is shown the size and type of fish as well.

Figure 2:
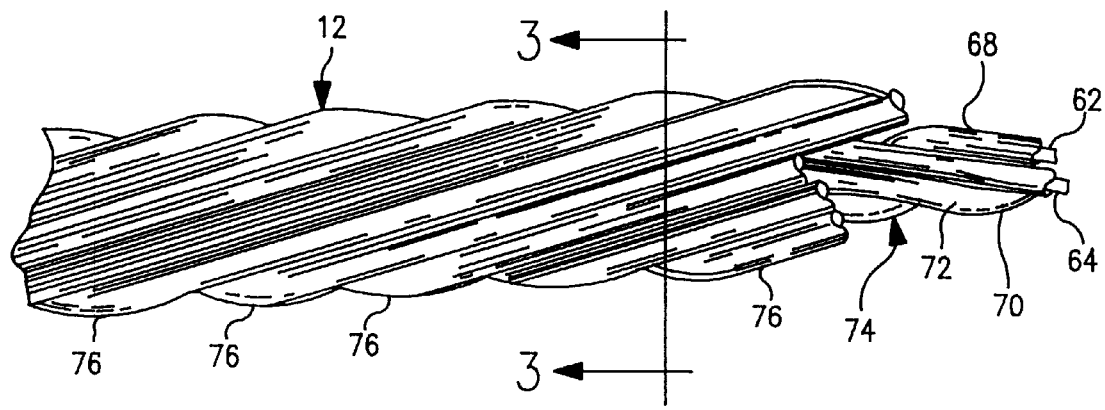
FIG. 2 is a greatly enlarged fragmentary view of the cable shown in FIG. 1.
Figure 3:
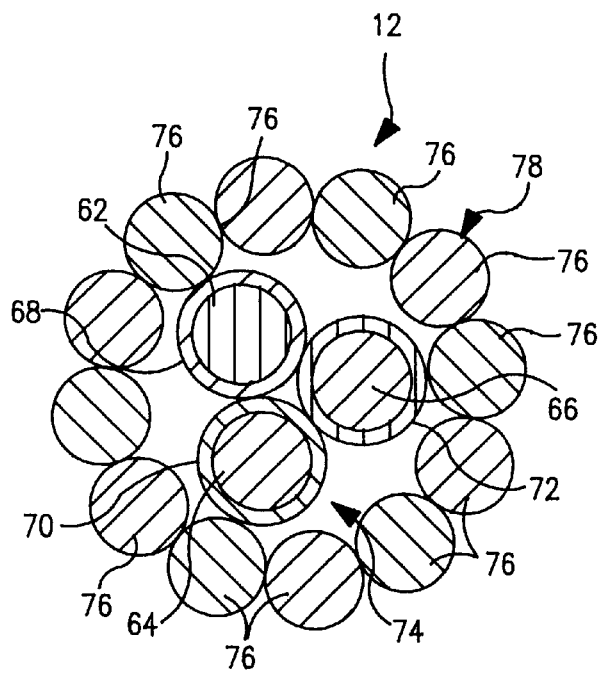
FIG. 3 is a cross-sectional view of the cable of FIG. 2, taken along section plane 3—3.

Referring now to FIGS. 2 and 3, the cable 12 employed in the underwater viewing system 10 of FIG. 1 is described in greater detail. The cable 12 preferably comprises three conductive leads 62, 64, and 66. Individually surrounding each electrical lead 62, 64, and 66 is an annular longitudinally extending electrically insulating layer 68, 70, and 72, respectively. The insulated conductive leads 62, 64, and 66 are spirally wound around each other to form a helix arrangement 74 wherein the leads preferably twist approximately three (3) times around each other per four (4) centimeters of cable length.

It is desired that each electrical lead 62, 64, and 66 be Brown & Sharpe Wire Gage No. 26 (i.e. a diameter of about 0.4049 millimeters) and made of a suitable conductive material such as copper. Further, the electrically insulating layers 68, 70, and 72 comprise, in the preferred embodiment, a fluorocarbon polymer layer.

Spirally wound around the helix configuration 74 of insulated electrical leads 62, 64, and 66 are bare stainless steel strands 76. Preferably, there are twelve (12) outer strands 76 with each strand having an outer diameter of approximately 0.011 inches.

A conventional cable forming process is employed to tightly spiral wind the outer stainless steel strands 76 around the center conductors 62, 64, and 66 to form the relatively small diameter trolling wire 12 (i.e., less than 0.070 inches in diameter) while having the desired strength and durability. Preferably, the strands 76 are spirally wound in the opposite direction as that of the electrical leads 62, 64, and 66. The strands 76 adjoin against each other to form a protective sheath that envelopes the leads 62, 64, and 66. Desirably, the strands 76 are wound around the helix arrangement 74 approximately three (3) times for each four (4) centimeters of cable length. Further, the overall outer diameter of the resultant cable 12 is about 0.059 inches with a tensile strength of at least two hundred pounds (200lbs).

Referring to FIGS. 1 and 4–6, the connector assembly 15 preferably includes a connector housing 21 and a cinch 23 that coacts with a frictional lock or tongue 25. The connector housing 21 is generally cylindrical with a planar cable receiving end 27 and an opposite cinch receiving end 29. The connector housing 21 is preferably of unitary construction, having a cross-sectional diameter of about 1.9 centimeters, and made of a commercially available black acetal resin such as that available under the designation DELRIN, a homopolymer of formaldehyde.

A channel 31 extends across the circular diameter of connector end 29 to define a pair of shoulders 33,35 that are spaced from each other. The shoulders 33 and 35 have inner planar walls 37 and 39, respectively, that are generally parallel and face towards each other. Further, the walls 38,39 project substantially perpendicular from a planar abutment 41 provided by the connector housing 21 and extending between the shoulders 33 and 35.

Longitudinally extending through the connector housing 21 is an open cylindrical bore 43 having an inner diameter that is larger than the outer diameter of cable 12. The open ends of bore 43 are located at the ends 27,29 of the connector housing 21 with opening 47 positioned between shoulders 33 and 35. Preferably, bore 43 is in spaced parallel relationship to the longitudinal axis of the connector housing 21.

Another open bore 49 extends within the connector housing 21 having a cable receiving portion 51 and an offset portion 53 in fluid communication with each other. Preferably, the cable receiving portion 51 is in longitudinal axial alignment with the longitudinal axis of the connector housing 21 and includes an open end 55 positioned between shoulders 33 and 35. Further, the offset portion 53 converges toward connector housing end 27 with an open end 57 proximate thereto.

The open end 57 is preferably located in spaced relationship between the inner walls 37 and 39 of shoulders 33 and 35, respectively. Further, open end 57 is provided on the outer cylindrical surface of the connector housing 21.

Received within channel 31 of connector housing 21 is cinch 23 preferably of unitary construction made of a plastic material such as a polyester resin, e.g. a polyethylene terephthalate (PET), or the like. The cinch 23 includes two symmetrical planar plates 59,61 in spaced parallel relationship to each other and providing a slot 63 therebetween. Each plate 59,61 generally resembles a fin with a planer proximal end 65 and an opposite rounded or blunted distal end 67. Further, each plate 59,61 has a generally straight front edge surface 69 extending between ends 65 and 67. Conversely, an outwardly angled back edge surface 71 extends opposite the front edge surface 69 and having an straight inner portion 73 angularly offset from an outer portion 75. Further, the inner portion 73 extends from the cinch proximal end 65 and, preferably, has a shorter length than the outer portion 75.

Interconnected between the plates 69,61 are two diverging side walls 77,79 extending from the proximal end 65 of the cinch 23. The walls 77,79 extend proximate to the front edge 69 and back edge 71, respectively, of plates 59 and 61. The length of wall 79 is longer than the length of wall 77 with wall 79 extending from the proximal end 65 of the cinch 23 to the outer portion 75 of the back edge 71.

The walls 77 and 79 have inner surfaces 81 and 83, respectively, that are substantially perpendicular to the plates 59,61. The wall inner surfaces 81,83 diverge from each other as they extend from the cinch proximal end 65. The wall surfaces 81,83 can be, for example, planer or grooved to match a groove on the outer periphery of the cinch 23.

The walls 77,79 also have co-planar end surfaces 85 proximate to end 65 of the cinch 23 and opposite end surfaces 87. Further, the opposite end surface 87 of wall 79 is curved inwardly to provide an arcuate outer surface.

The walls 77,79 together with the plates 59,61 define a chamber 91 adapted for receiving tongue 25 therebetween. The chamber 91 has a narrow opening 93 at the proximal end 65 of the cinch 23 and an opposite wide opening 95 between the wall ends 87 and the plates 59,61.

The cinch 23 is secured to the connector housing 21 by two screws 97. The cinch 23 is positioned between the two shoulders 33,35 of the connector housing 21. As such, the proximal end 65 of the cinch 23 abuts against the planar end surface 41 of the connector housing 21. Further, the outer surface of the cinch plates 59 and 61 abut against the inner surface 37 and 39, respectively, of the shoulders 33,35.

When the cinch 23 is affixed to the connector housing 21, both connector bores 43 and 49 are in fluid communication with the cinch chamber 91. Moreover, the back edge surface 71 of the cinch 23 is longitudinally aligned with opening 57 of bore 49.

The screws 97 that attach the cinch 23 to the connector housing 21 extend though apertures 99 in the connector housing that are in axial alignment with each other and the center of each shoulder planer inner wall 37,39. Accordingly, the screws 97 project perpendicular from each shoulder inner planar surface 37,39 and into thread apertures 101 in the cinch plates 59,61. However, it is desired that the screws 97 do not enter into the cinch chamber 91.

Pivotally attached proximate to the cinch distal end 67 is snap swivel 17 for removable attachment of the connector assembly 15 to the camera assembly 16. The swivel 17 has an ring 103 that is rotationally mounted within the slot 63. As such, the ring 103 receives a rivet 105 that passes through the cinch plates 59,61 and is secured thereto.

Cable 12 passes through bore 43 in the connector housing 21 and into the cinch chamber 91. The distal end 32 of the cable passes through opening 55 and thus into bore 49. The distal end 32 of the cable is unraveled within bore 49 to separate the insulated electrical leads 62, 64, and 66 from the stainless steel strands 76.

Preferably, the distal ends of the stainless steel strands 76 are securely fastened together within a crimp sleeve 107. Further, the stainless steel strands 76 and the electrical leads 62, 64, and 66 are electrically coupled to a wiring harness 109 for transmitting signals and electrical power between the cable 12 and the camera assembly 16.

The wiring harness 109 is conventional in construction with four insulated electrical leads 111 coupled to cable leads 62, 64, 66, and strands 76. The harness leads 111 are attached to the cable leads by a solder connection and then covered by conventional heat shrinkable insulative material 113. Further, the strands 76 are connected to one harness lead 111 by a crimp connection within sleeve 107.

The harness leads 111 extend within an outer protective sleeve 115 that exits the bore 49 from aperture 57 and terminates with conventional electrical connector plug assembly 19 attached thereto. Preferably, to secure the harness 109 and the cable 12 to the connector housing 21, the bore 49 is filled with a polyurethane or the like.

The connector plug 19 includes a threaded sleeve 121 and two prongs 123,125. Sleeve 121 is conventional in construction and provides for securing the connector plug 19 to a receptacle on the camera housing. Likewise, the prongs 123,125 are convention and provide for making an electrical connection with the receptacle. In an embodiment, prong 125 is generally cylindrical and is electrically connected, via one of the harness wires 111, to the cable strands 76 or, alternatively, to one of the leads 62, 64, or 66. Further, prong 123 is generally semicircular in cross-section and provides female contacts (not shown) that are preferably electrical coupled to the electrical leads 62, 64, and 66.

Figure 8:
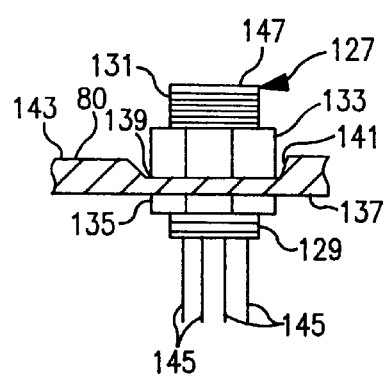
FIG. 8 is a partial cross-sectional view of a plug connector receptacle provided by the camera assembly of FIG. 1.

The plug connector 19 mates with a receptacle 127 mounted onto the camera assembly housing 80 and depicted in FIG. 8. The receptacle 127 includes a waterproof fitting 129 having a conventional electrical socket at end 147 and a threaded outer surface 131. The fitting 129 passes through a recessed or depressed area 141 in the outer surface 143 of the camera assembly housing 80 with the socket end 147 assessable from the outside.

Threaded onto the outside 131 of the fitting 129 is an outer nut 133 and a jam nut 135. Preferably, the jam nut 135 abuts against the inside surface 137 of the camera housing 80. Conversely, an o-ring 139 is sandwiched between the outer nut 133 and the outer surface 143 of the camera housing 80. The outer nut 133 is tightened to compress the o-ring 139 surrounding the fitting 129 to form a waterproof seal between the fitting and the camera housing 80.

An electrical connection between the cable 12 and the leads 145 within the camera assembly housing 80 is formed by plugging the connector 19 into the fitting 129. Then, the threaded sleeve 121 of the connector 19 is tightened onto the threaded outer surface 131 of the fitting 129. Likewise, the electrical connector is uncoupled from the camera assembly housing 80 by removing the sleeve 121 from the fitting 129 and then pulling the connector 19 from fitting.

Figure 9:
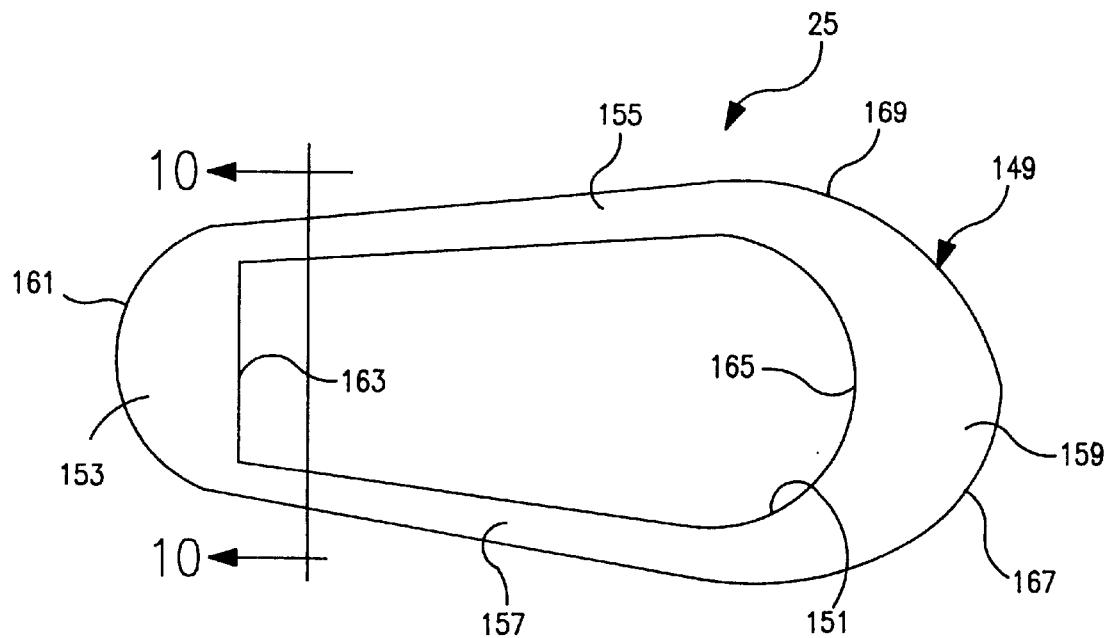
FIG. 9 is a side view of the tongue of FIG. 6.
Figure 10:
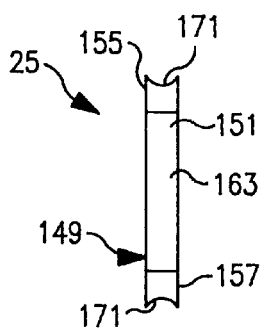
FIG. 10 is a cross-sectional view of the tongue of FIG. 9, taken along plane 10—10.

As shown in FIGS. 9 and 10, the tongue 25 has a generally cam shaped tapered body member 149 with an aperture 151 extending therethrough. The body member 149 includes an insert end portion 153, two arm members 155,157 and an outer portion 159 which together define an outer periphery for engaging cable 12.

The insert portion 153 has a generally parabolic outer surface 161 and a planar inner surface 163. The arm members 155,157 of the body member 149 extend from the insert 153 and diverge from each other. The arm members 155,157 are attached to the outer portion 159 which has generally a crescent shape with inner 165 and outer 167 arcuate surfaces. Preferably, the body member 149 has a smooth outer periphery or rim 169 with a concave groove or channel 171 for receiving a portion of the cable 12. Moreover, the body member 149 is of unitary construction and made of a polyester resin such as polyethylene terephthalate (PET).

Figure 7:
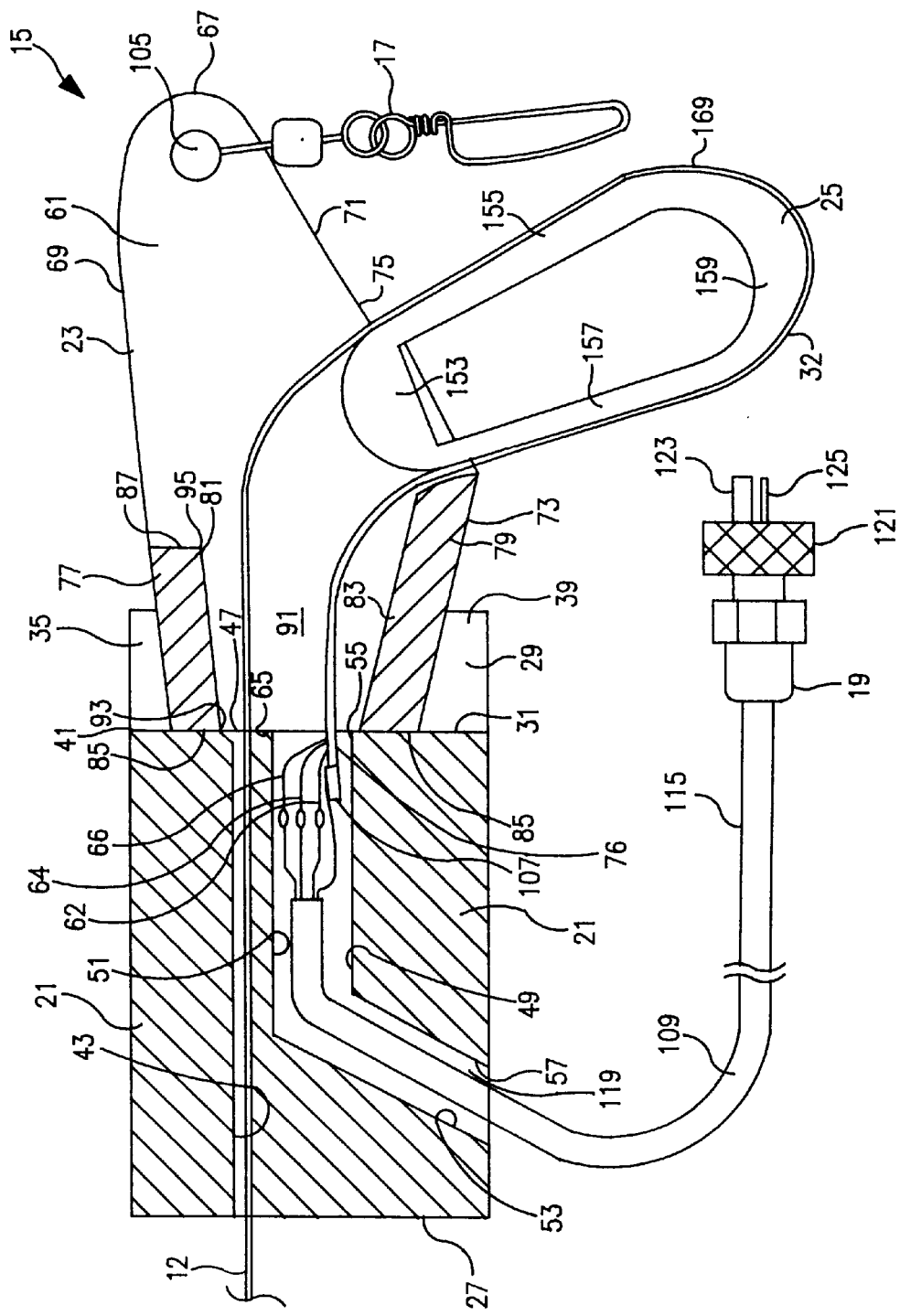
FIG. 7 is similar to FIG. 6, but with the cable loosened to allow the tongue to become disengaged.

As shown in FIG. 7, the cable 12 is looped about the outer periphery 169 of the tongue 25 defined by body member arms 155,157 and outer portion 159. By pulling the cable 12 from the first end 29 of the connector housing 21, the cable slides against the outer periphery 169 of the tongue 25 while advancing portion 153 into the cinch chamber 91. That is, in use tongue 25 is held in place by a bight in cable 12.

Figure 6:
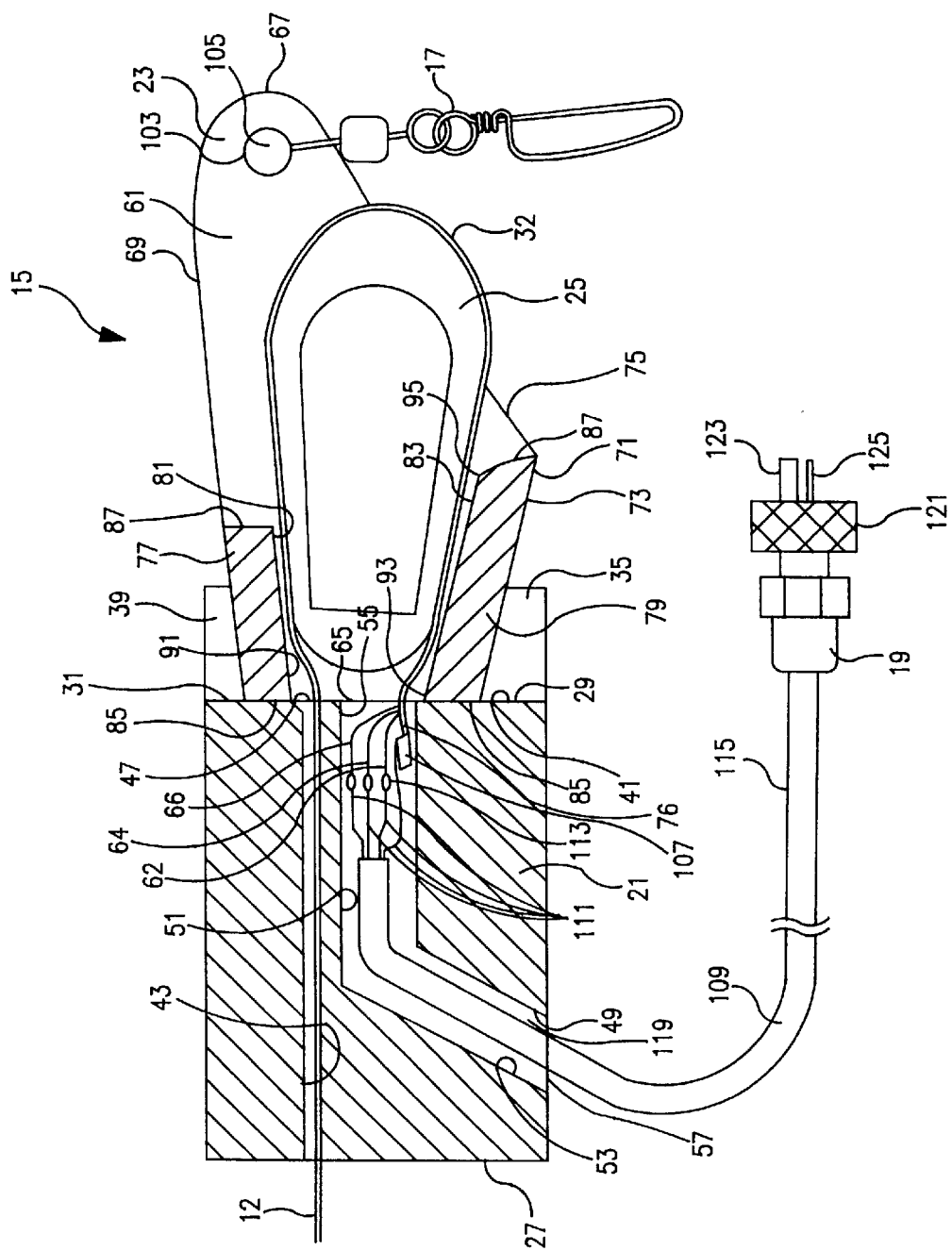
FIG. 6 is a cross-sectional view of the connector assembly of FIG. 4, taken along plane 6—6, depicting a tongue frictionally engaging the cable within a cinch.

The pulling force on the cable 12 results in the cable becoming wedged between the tongue 25 and the inner surfaces 81,83 of the cinch walls 77,79 as shown in FIG. 6. Accordingly, the more force applied to the cable results in a like force being applied to wedge the cable between the walls 77,79 and the tongue 25.

Figure 4:
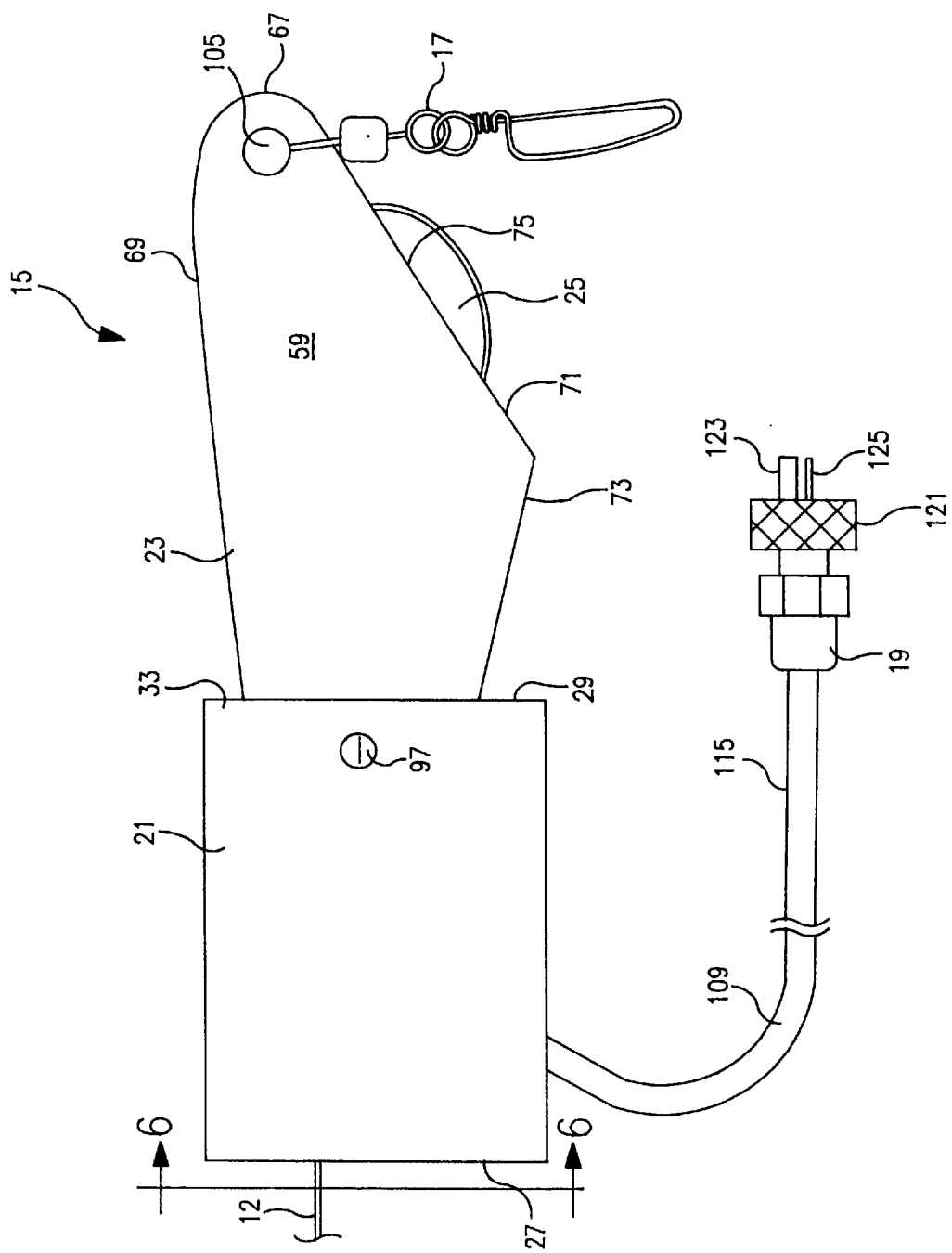
FIG. 4 is an enlarged side view of the connector assembly of FIG. 1.
Figure 5:
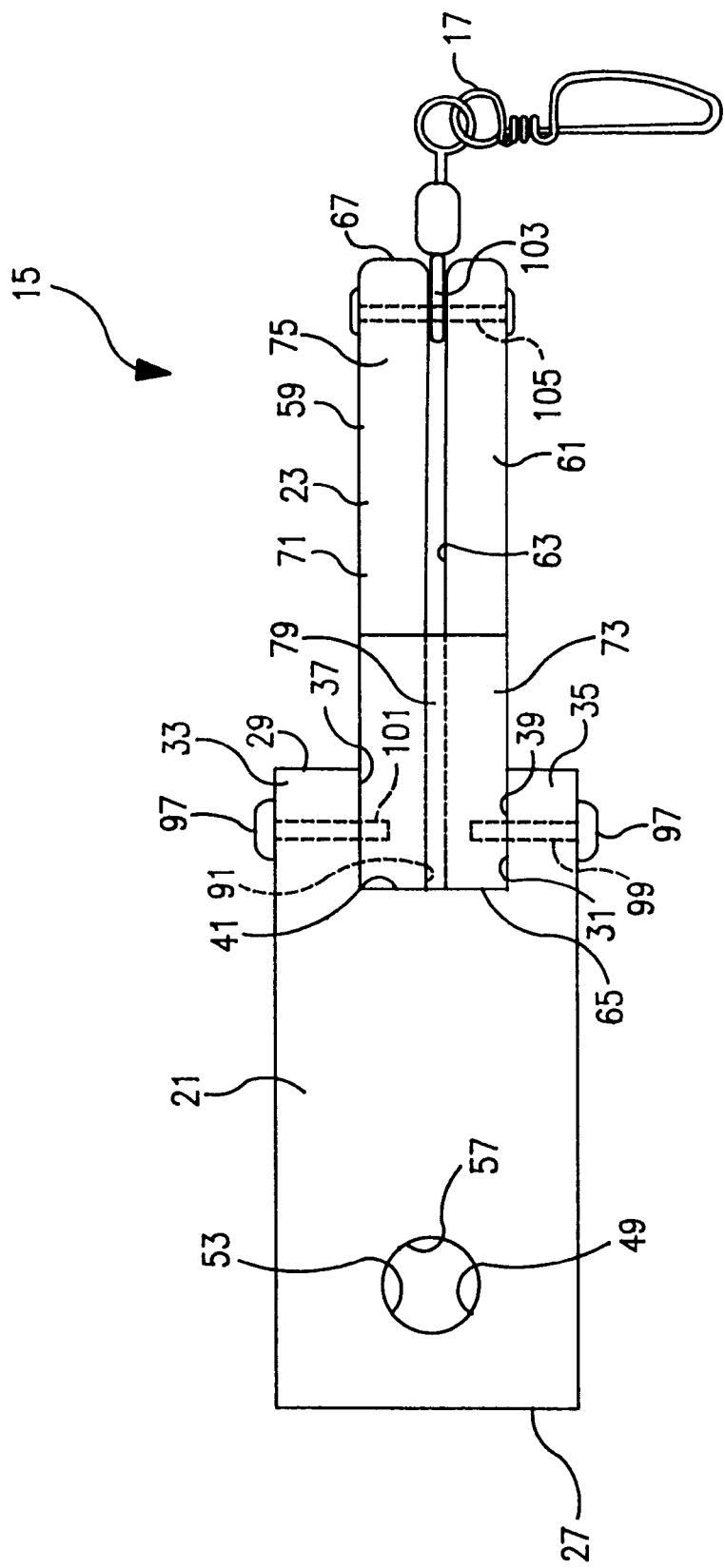
FIG. 5 is another side view of the connector assembly of FIG. 4.

Preferably, part of the tongue outer portion 159 outwardly projects from between the cinch plates 59,61, as shown in FIG. 4, when the cable is wedged by the tongue 25 within the cinch 23. The exposed portion can be gripped by pliers or the like to pull the tongue 25 from the cinch 23 to release the cable 12 from the cinch.

The wedging of the cable 12 between the tongue 25 and the walls 77,79 of the cinch 23 results in the cable being securely held at two different areas. Further, the holding force is distributed along part of the length of the walls 77,79 and the tongue 25.

The connector assembly 15 is securely fastened to the camera assembly 16 by attaching the snap swivel 17 towards the front of the camera housing. Further, the plug connector 19 is attached to the receptacle 127 extending from the camera housing 80. Preferably, the receptacle 127 is located aft of where the snap swivel 17 attaches to the camera housing 80. Moreover, the wire harness 109 has a length such that, by pulling on cable 12, the pulling forces are conveyed from the cable to the camera assembly 16 by swivel 17 and not the wire harness 109. As such, pulling forces applied by trolling with boat 14 are transferred across the swivel 17 and not the leads 62, 64, and 66 within connector bore 49.

Referring back to FIG. 1, camera assembly 16 preferably includes a housing 80 with a camera 82 and lower electronics unit 84 mounted therein. The housing 80 is generally parabolic in cross-sectional shape with a blunted front end 86 and an opposite open rear end 88. The desired shape of the housing 80 results in the housing rear end 88 being substantially directed at the lure 52 as the housing travels through the water 18 during trolling. The housing 80 may be constructed of any suitably material such as plastic, metal, or a metal alloy.

To further aid in the stability of the housing 80, release cord 46 is attached to the top 89 of the housing proximate to the rear end 88. As such, during trolling, the water resistance on the fishing line 50 and the release 48 acts as a rudder to aid in pointing the housing rear end 88 generally towards the lure 52. In addition, to dampen yaw and the like, fins (not shown) may be added to the outside of the housing 80.

As indicated above, the housing 80 provides an open cavity 90 in communication with the housing rear end 88. Enclosing the housing rear end 88 and forming a watertight seal with the housing 80 is an optically transparent cap 92. The seal is preferably waterproof to a depth of four hundred feet (400') or greater to prevent water from entering the housing cavity 90 and damaging the camera 82 mounted therein.

Camera 82 is mounted in the housing cavity 90 adjacent to the housing end cap 92. The lens of the camera 82 is pointed generally towards the fishing lure 52 such that the lure is in the field of view 54 and focus of the camera. Thus, camera 82 provides composite video signals representative of the images introduced within the camera's field of view 54.

The camera 82 desirably is a relative low light level type. For example, tests results with a ProVideo camera Model No. CVC-50BC with a resolution-of 512(H)×492(V) picture elements, EIA standard 525 TV lines (60 fields per second), and a sensitivity of 0.1 lux (F:1.6). (CSI/SPECO, Lindenhurst, N.Y.). Preferably, the camera 82 has a focus range of approximately three (3) to ten (10) feet and is powered by twelve (12) volts at less than 1.2 watts.

Figure 11:
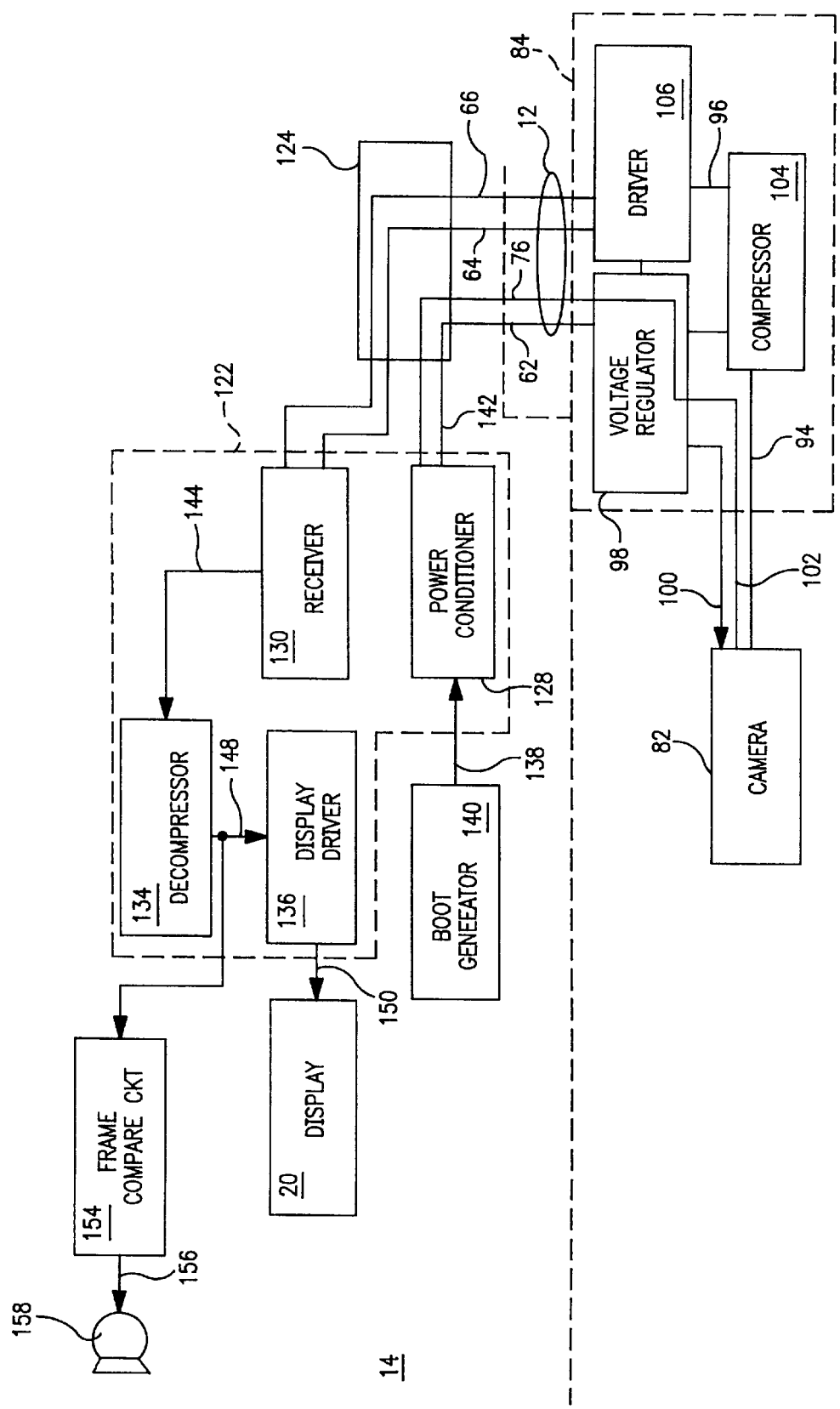
FIG. 11 is an electrical circuit diagram in block form of an embodiment of the underwater viewing system shown in FIG. 1.

The camera 82 is operably connected to the lower electronics unit 84 within the housing cavity 90. Further, as shown by FIG. 11, the lower electronics unit 84 is connected to conductive leads 62, 64, and 66 and at least one of the outer conductive strands 76 of cable 12. The outer strands 72 are secured to the housing 80 to pull the housing through the water during trolling with, as indicated above, at least one strand 76 extending into the housing cavity 90.

Within FIG. 11, a single block may indicate several individual components and/or circuits which collectively perform a single function. Likewise, except for the leads 62, 64, and 66 of cable 12, a single line within FIG. 11 may represent several individual signal or energy transmission paths for performing a particular operation.

The lower electronics unit 84 provides for regulating the voltage supplied to the camera 82, compressing the composite video signals 94 generated by the camera, and driving the compressed video signals 96 from the camera assembly 16 to the boat 14.

A voltage potential is provided from the fishing boat 14, via power supply lead 62, to a voltage regulator 98 within the lower electronics unit 84. The voltage potential is regulated and conditioned by the voltage regulator 98 to supply the camera 82 with a suitable supply voltage 100. Likewise, the camera 82 is provided with a voltage return path 102 to the boat 14 via the serially connected electronics unit 84 and at least one strand 76 of cable 12.

In an embodiment wherein the cable 12 has a length of 200 feet or greater, and color or black and white composite video signals are to be transmitted from the camera to the display, the lower electronics unit 84 provides a compressor 104 for compressing the composite video signals 94 in real-time. The compressor 104 is operably connected to the camera 82 for generating compressed video signals 96 from the camera output signals 94. At cable lengths of 200 feet or greater, such video compression is desirable to reduce bandwidth or reflections that occur as the cable 12 becomes a transmission line.

The process used by the compressor 104 to condense the composite video signals 94 can be by any appropriate means known in the art to compactly represent the image data contained within the composite video signals as output signals 96. For example, the compressor 104 may operate in a similar manner as that used by ANALOG DEVICES in their ADV 601 Low Cost Multiformat Video Codec. (Analog Devices, Inc., Norwood, Mass). Correspondingly, the output signals 96 of the compressor 104 are directly related to the input signals 94 provided by camera 82.

The compressed video signals 96 generated by compressor 104 are received by driver 106 within the lower electronics unit 84. The driver 106 converts and transmits the compressed video signals 96 to the boat 14, via cable 12, as differential signals on twisted-pair leads 64 and 66. As such, the driver 106 may include a pair of video amplifiers with high-output drive capability or other like elements suitable for converting the compressed video signals 96 into differential output signals.

Figure 12:
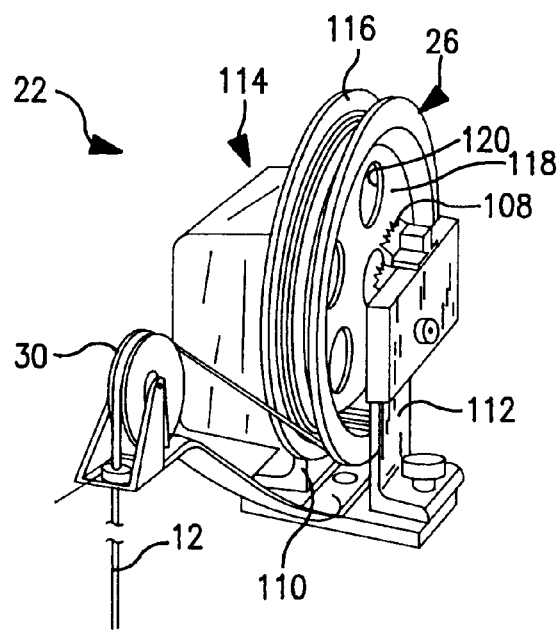
FIG. 12 is a front perspective view of the motorized reel assembly shown in FIG. 1.
Figure 13:
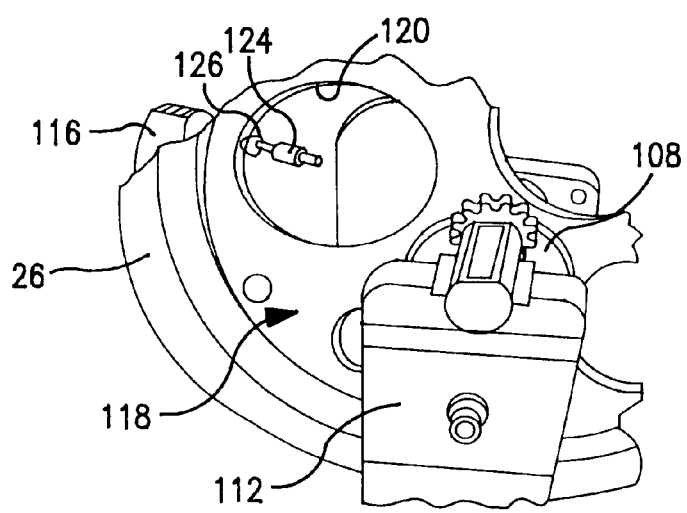
FIG. 13 is an enlarged partial perspective view of the motorized reel assembly shown in FIG. 12.

Turning to FIGS. 12 and 13, cable 12 is wrapped around the reel 26 of motorized assembly 22 which is conventional in construction. The motorized assembly 22 consists of, for example, the device disclosed by U.S. Pat. No. 3,916,555, issued to Booth et al., and incorporated herein by reference.

The reel 26 includes a central spindle 108 which is secured to a reel shaft rotatably supported between arms 110 and 112 by means of a pair of bearings fitted into the arms near the top. The shaft extends at one end into a reel drive unit 114 that includes a reversible drive motor to be rotatably driven thereby. The reel 26 is of ABS with a channeled perimeter 116 for holding the cable 12. A web 118 extends between spindle 108 and channel 116 of the reel 26 and includes a plurality of spaced apertures 120.

The cable 12 wound about reel 26 is operably connected to an upper electronics 122, depicted in FIG. 11, via a conventional quick disconnect or reel connector 124. Preferably, the cable 12 extends through the end of reel channel 116 and is anchored at one end of the reel 26 at an edge of one of the apertures 120 by a crimping clip 126 or the like. An aperture is drilled through the channel and a portion of the reel web to allow cable 12 to be so anchored. The reel connector 124 is coupled to the end of the cable 12 to provide connecting means for electrically connecting the cable to the upper electronics unit 122.

Connecting the cable 12 to the upper electronics unit 122 in the manner described above ensures that the electrical characteristics of the signal transmission paths between the upper electronics unit and the lower electronics unit 84 are substantially constant. This is preferred over other methods of connecting the cable 12 to the upper electronics unit 122, such as using slip rings, which can generate noise and other unstable electrical characteristics in the cable signal transmission paths 62, 64, and 66.

Figure 14:
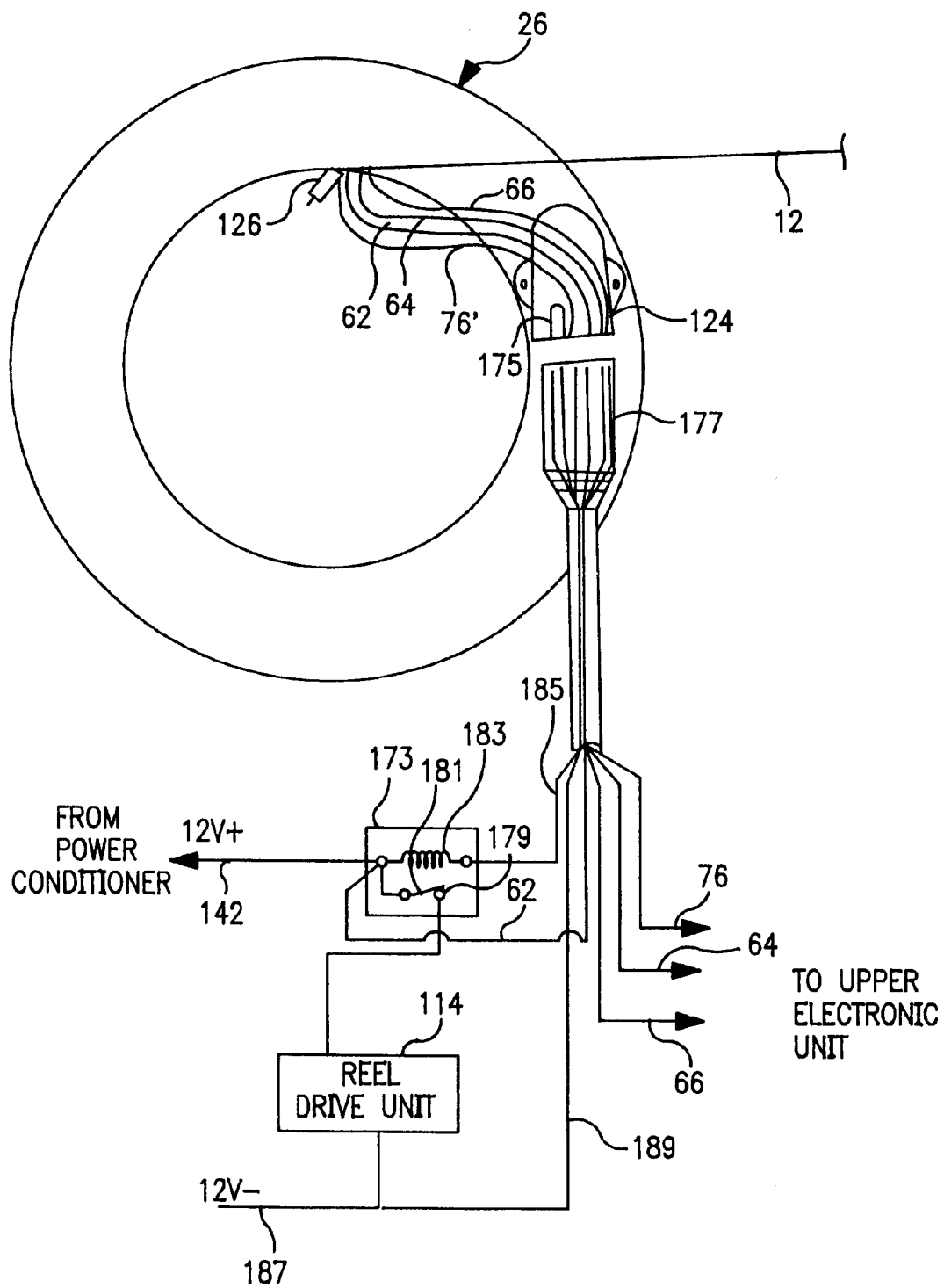
FIG. 14 is a schematic diagram of inadvertent cable uptake protection circuitry for the motorized reel assembly shown in FIG. 1.

In an embodiment, inadvertent uptake of the cable 12 while it is attached to the upper electronics unit 122 is prevented by the protection circuity of FIG. 14. The circuitry includes an interrupt relay 173 and a return current path 175 for disabling the reel drive unit 114 when plug 177 is inserted into connector 124.

Plug 177 mates with connector 124 for connecting the upper electronics unit 122 to the cable 12. As, shown in FIG. 14, the connector 124 can be alternatively mounted on the side of the reel 26, if desired. The cable leads 62, 64, and 66 extend within the connector 124 and the strands 76 of the cable 12 are electrical coupled to the connector by a lead 76'crimped within clip 126. Further, return current path 175 is provided within the connector 124 for toggling the interrupt relay.

The interrupt relay 173 has a contact 179, an armature 181, and a coil 183. The armature 181 and one end of the coil 183 are electrically connected to a supply voltage 142 such as, for example, 12 volts dc. The other end of the coil 183 is connected to a lead 185 extending from the plug 177.

The relay contact 179 is electrically connected to the reel drive unit 114. Preferably, the armature 181 is biased to electrically connect the contact 179, and thus the reel drive unit 114, to the supply voltage 142.

To operate, the reel drive unit 114 preferably must be connected to the supply voltage 142 and a reference voltage 187 of, for example, −12 volts dc. The reference voltage 187 also is connected to a lead 189 extending to the plug 177.

When the plug 177 is removed from the connector 124, power is provided to the reel drive unit 114 for rasing and lowering the cable 12. The power is provided from the supply voltage 142, via the relay 173, and the reference voltage 187.

Conversely, when the plug 177 is attached to the connector 124, power is effectively removed from the reel drive unit 114 to prevent inadvertent uptake of the cable 12. Attaching the plug 177 to connector 124 results in lead 185 becoming coupled to lead 189 via a connection formed by both leads with the current return path 175. As such, a voltage potential is asserted across the coil 183 consisting of the difference between the supply voltage 142 and the reference voltage 187. Accordingly, energizing the coil 183 results in the armature 181 breaking the electrical connection with contact 179. Thus, the supply voltage 142 is operably disconnected from the reel drive unit 114.

Power is restored to the reel drive unit 114 by removing the plug 177 from the connector 124. This results in lead 185 being electrically disconnected from the current return path 175, and thus lead 189. Accordingly, the armature 181 reverts back to its biased state of electrically connecting the contact 179, and thus the reel drive unit 114, to the supply voltage 142.

The upper electronics unit 122 is mounted on the boat and, as shown in FIG. 11, is coupled via connector 124 to the electrical leads 62,64,66 and at least one of the outer conductive strands 76 of cable 12. The upper electronics unit 122 provides a power conditioner 128, a receiver 130, a decompressor 134, and a display driver 136.

The power conditioner 128 is coupled to an unregulated voltage source 138 provided by the boat 14 such as a marine battery or generator 140. The power conditioner 128, which is conventional in construction, regulates the boat voltage 138 to generate a conditioned supply voltage 142 that is transmitted, via lead 62, to the lower electronics unit 84.

Preferably, the power conditioner 128 converts the boat voltage 138 into a conditioned voltage 142 wherein noise generated by electromagnetic interference from other electrical systems on the boat is removed. The power conditioner 128 also is capable of providing a substantially constant voltage potential to-the lower electronics unit 84 during periods where the boat supply voltage 138 is temporary interrupted or drops to a low level such as when starting the engine of the boat 14.

The typical fishing boat 14 will provide power conditioner 128 with an unregulated voltage potential 138 of about twelve (12) volts. However, because the camera 82 preferably requires a supply voltage 100 of twelve (12) volts, it is desired that the power conditioner 128 boost the supply voltage 142 to overcome the voltage drop across the cable 12. For example, if the camera 82 requires twelve (12) volts and the line drop across the cable 12 is two (2) volts, then the output of the upper electronics unit provides a conditioned supply voltage 142 of fourteen (14) volts.

In an alternative embodiment, the camera 82 may be powered by one or more batteries contained within the camera assembly 16. Thus, the upper electronics unit power conditioner 128, electrical lead 62, and lower electronics unit voltage regulator 98 would be eliminated in such an embodiment since the lower electronics unit 84 would contain its own self-sufficient voltage source.

Returning back to the embodiment shown in FIG. 11, the upper electronics unit receiver 130 receives the differential signals transmitted, via twisted-pair leads 64 and 66, by driver 106. The receiver 130 converts the differential signals into an output signal 144 preferably consisting of a single ended compressed video output. As such, the receiver 130 may include a video amplifier with a high-output-drive capability or other like elements appropriate for converting differential signals into video output signals.

The video output 144 from receiver 130 is received by the decompressor 134 which transforms the compressed signals into reconstructed composite video signals 148 in real-time. Preferably, the compressed signals 144 are transmuted by using a suitable decompression algorithm such that the composite video signals 148 are substantially similar to the camera video output signals 94.

The display driver 136 is operably connected to the decompressor 134 for receiving the composite video signals 148. The display driver 136 processes the composite video signals 148 to generate display signals 150 compatible with display 20. Preferably, the display signals 150 are provided by display driver 136 in a standard NTSC video format.

As indicated above, the output signals 150 of driver 136 are received by display 20 which provides images of the lure 52 and any fish in the camera's field of view 54. The display 20 preferably consists of a conventional black and white CRT which can be powered by a twelve (12) volt source. Alternatively, the display 20 may provide color images of the lure 52 and any fish.

The present invention may also include a frame compare circuit 154 for generating an indicator signal 156 whenever a fish approaches the lure 52. The frame compare circuit 154 is operably connected to the upper electronics unit 122 for receiving composite video signals 148 from decompressor 134. The compare circuit 154 detects changes in the video signals 148 such that, when a significant change as described below occurs, signal 156 is generated to activate a warning horn 158 or other audible alarm device.

Preferably, the frame compare circuit 154 filters the signal 148 such that motion of the lure 52 or gradual changes in water color will not cause activation of the horn 158. However, sudden significant changes, such as a fish approaching the lure 52, will result in the frame compare circuit 154 sounding the horn 158.

In operation, the fisherman lowers the weighted cable 12 and accompanying releasably attached fishing line 50 by actuating the motorized reel assembly 22 shown in FIGS. 1, 12, and 13. Once the desired depth has been reached, the reel assembly 22 is deactivated thus holding the fishing lure 52 substantially at the desired depth. With the present invention, a significant length of cable 12 can be wound on reel 26 to reach depths up to or even in excess of 200 feet where required.

The connector 124 is then coupled to the cable 12 to provide for the transmission of images about the lure 52 to the display 20. The fisherman then proceeds to troll with the camera assembly 16 while monitoring the real-time images of the lure 52 provided via display 20.

The strong stainless steel outer shield 78 of the cable 12 provides for the high tensile strength required for trolling with the submerged camera assembly 16, and weight 44, which may be payed out a significant distance and become snagged. Further, the twisted pair of data leads 64,66 within the cable 12 allow for the images from the camera to be transmitted, in real-time, to the boat 14.

If the fisherman becomes distracted, the frame compare circuit 154 will activated the horn 158 to alert the fisherman when a fish approaches the lure 52. The fish may strike the lure 52 which results in mechanism 48 releasing the fish line 50 so that the fisherman may play the fish without the fish line being attached to the downrigger.

Figure 15:
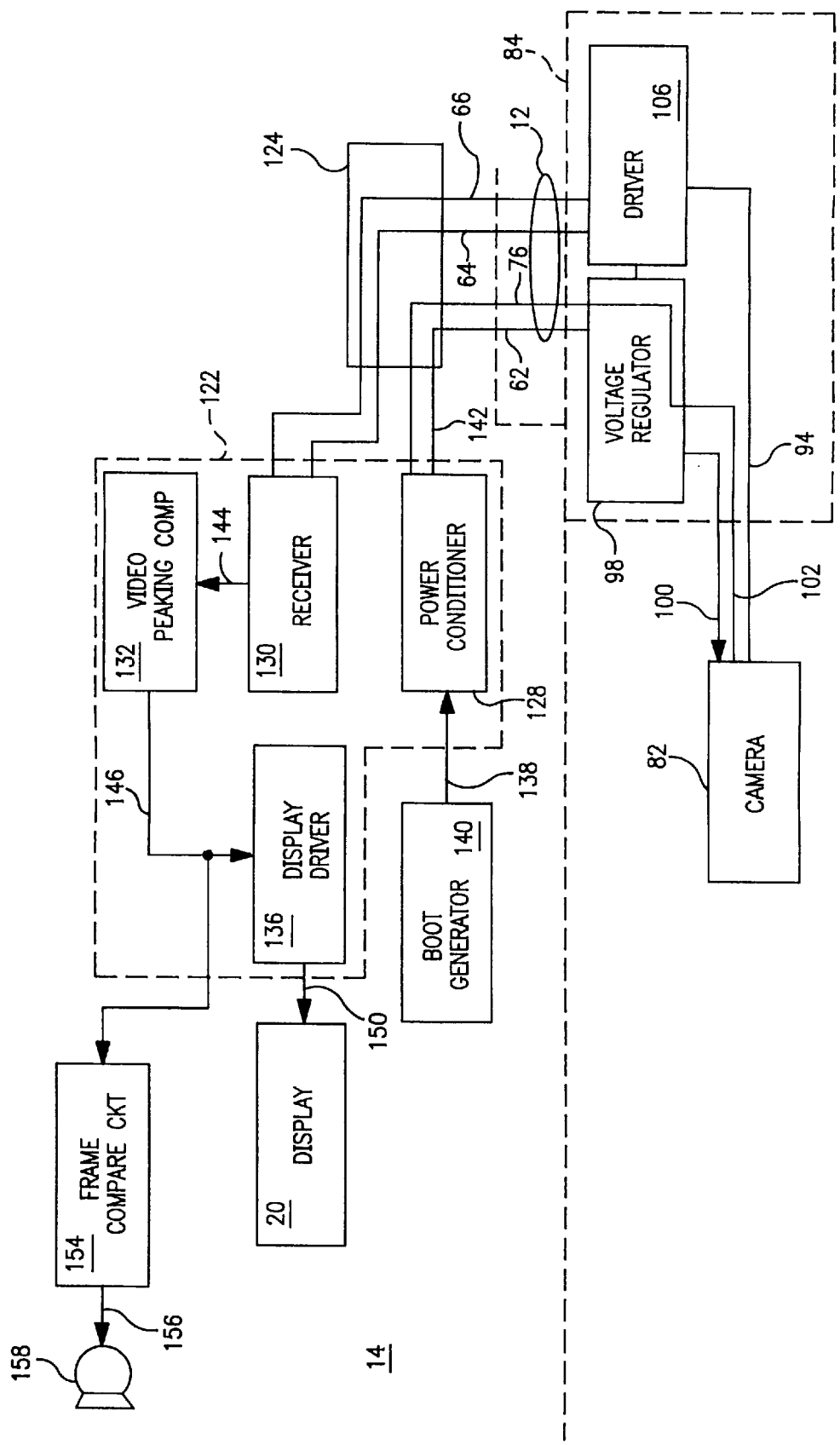
FIG. 15 is an electrical circuit diagram in block form of another embodiment of the underwater viewing system shown in FIG. 1.

Referring to FIG. 15, an electrical circuit diagram in block form is provided of another embodiment of the underwater viewing system shown in FIG. 1. The embodiment of FIG. 15 is similar to that of FIG. 11 except that the compressor has been eliminated and the decompressor has been replaced by a video peaking compensation circuit 132.

In FIG. 15, the cable 12 may have a length of 200 feet or greater and preferably is used for the transmission of black and white composite video signals from the camera 82 to the display 20. As such, the driver 106 is operably connected to the camera 82 to receive the black and white composite video signals 94. The driver 106 converts and transmits the video signals 94 to the boat 14, as differential signals, via twisted-pair leads 64 and 66.

The upper electronics unit 122 is attached to the cable 12 via connector 124 and preferably includes power conditioner 128, receiver 130, video peaking compensation circuit 132, and display driver 136. The receiver 130 within the upper electronics unit 122 receives the differential signals conveyed on twisted-pair leads 64 and 66. The receiver 130 converts the differential signals into output signals 144 which preferably consist of a single ended video output.

The video output 144 from receiver 130 is adjusted by the video peaking compensation circuit 132. The compensation circuit 132 increases bandwidth to correct for smearing and blurring of the video output caused by the RC time constant of the cable 12 capacitance. As such, the compensation circuit 132 produces rectified video output signals 146 that are substantially similar to the composite video signals 94 generated by the camera 82.

The display driver 136 is operably connected to the compensation circuit 132 for receiving the rectified video output signals 146. The display driver 136 processes the composite video signals 148 to generate display signals 150 compatible with display 20.

The frame compare circuit 154 also is coupled to the rectified video output 146 of the compensation circuitry 132. Thus, the warning horn 158 will be activated if a fish approaches the lure 52.

It will be readily apparent from the foregoing detailed description of the invention and from the illustrations thereof that numerous variations and modifications may be effected without departing from the true spirit and scope of the novel concepts or principles of this invention.

We claim:

1. A coupling system suitable for use with a cable comprising:
   (a) a generally cylindrical housing defining an open bore having an aperture at one end of said housing and adapted to receive said cable;
   (b) a cinch attached to said housing and having two walls that diverge from each other and away from said aperture;
   (c) a wire harness operably coupled to said housing; and
   (d) a tongue received between said walls and adapted to wedge said cable therebetween.

2. The coupling system of claim 1, wherein said cable is operably coupled to said wire harness and includes a plurality of conductive leads twisted about each other, said conductive leads being electrically isolated from each other, and an outer shield spirally surrounding said conductive leads.

3. The coupling system of claim 2, wherein said outer shield includes about twelve strands of stainless steel, each having an outer diameter of about 0.011 inches.

4. The coupling system of claim 2, wherein said conductive leads comprise three stands of conductive wire.

5. The coupling system of claim 2, wherein said conductive leads are operably coupled to a camera assembly.

6. A coupling system for a transmission cable having a plurality of conductive leads electrically isolated from each other and an outer shield spirally surrounding said conductive leads comprising:
   (a) a connector assembly including:
      (i) a housing defining an open bore adapted to receive said cable;
      (ii) a wire harness operably coupled to said housing;
      (iii) a cinch operably connected to said housing and having two plates with two walls interconnected therebetween to define a chamber in fluid communication with said bore, and said walls diverging from each other; and
   (b) a tongue sized to be received between said walls and adapted to wedge said cable therebetween.

7. The coupling system of claim 6, wherein said wire harness is operably connected to said conductive leads.

8. The coupling system of claim 6, wherein said wire harness includes an electrical connector.

9. The coupling system of claim 6, wherein said housing includes another bore in fluid communication with said chamber.

10. The coupling system of claim 6, wherein said housing includes another bore in fluid communication with said chamber and said wire harness partially extending therein.

11. The coupling system of claim 6, wherein said plates are substantially co-planar with each other.

12. The coupling system of claim 6, wherein a swivel is operably attached to at least one of said plates.

13. The coupling system of claim 6, wherein said cable is coupled to a reel having a reel connector for mating with a plug.

14. The coupling system of claim 13, wherein said reel is operably connected to a reel drive unit.

15. The coupling system of claim 14, wherein said reel drive unit is disable when said plug is connected to said reel connector.

* * * * *